(12) United States Patent
Evans

(10) Patent No.: US 11,334,499 B2
(45) Date of Patent: May 17, 2022

(54) METHOD FOR LOCATING METADATA

(71) Applicant: Arm Limited, Cambridge (GB)

(72) Inventor: Matthew Lucien Evans, Cambridge (GB)

(73) Assignee: Arm Limited, Cambridge (GB)

(*) Notice: Subject to any disclaimer, the term of this patent is extended or adjusted under 35 U.S.C. 154(b) by 64 days.

(21) Appl. No.: 16/756,288

(22) PCT Filed: Oct. 11, 2018

(86) PCT No.: PCT/GB2018/052916
§ 371 (c)(1),
(2) Date: Apr. 15, 2020

(87) PCT Pub. No.: WO2019/086831
PCT Pub. Date: May 9, 2019

(65) Prior Publication Data
US 2020/0242047 A1    Jul. 30, 2020

(30) Foreign Application Priority Data

Nov. 2, 2017  (GB) ..................................... 1718174

(51) Int. Cl.
*G06F 12/10*    (2016.01)
*G06F 9/455*    (2018.01)
(Continued)

(52) U.S. Cl.
CPC ...... *G06F 12/1009* (2013.01); *G06F 9/45558* (2013.01); *G06F 16/2282* (2019.01);
(Continued)

(58) Field of Classification Search
CPC ............ G06F 12/1009; G06F 16/2282; G06F 9/45558; G06F 2009/45583;
(Continued)

(56) References Cited

U.S. PATENT DOCUMENTS

2009/0013149 A1    1/2009  Uhlig et al.
2010/0169382 A1    7/2010  Sheaffer et al.
(Continued)

FOREIGN PATENT DOCUMENTS

WO    2010/151267    12/2010

OTHER PUBLICATIONS

International Search Report and Written Opinion of the ISA for PCT/GB2018/052916, dated Jan. 14, 2019, 15 pages.
(Continued)

*Primary Examiner* — Masud K Khan
(74) *Attorney, Agent, or Firm* — Nixon & Vanderhye P.C.

(57) ABSTRACT

A method for locating metadata associated with a first address. The method comprises: accessing a page table structure, a page table entry of said page table structure providing address translation data for use in an address translation process for translating said first address into a second address; extracting (906) portions of at least two page table entries in the page table structure, determining (906) a pointer to a metadata table from said portions, and using (908) the pointer to locate from the metadata table target metadata associated with the first address.

18 Claims, 10 Drawing Sheets

(51) Int. Cl.
*G06F 12/1009* (2016.01)
*G06F 16/22* (2019.01)

(52) U.S. Cl.
CPC .............. *G06F 2009/45583* (2013.01); *G06F 2212/657* (2013.01)

(58) Field of Classification Search
CPC ....... G06F 2212/657; G06F 2212/1016; G06F 2212/1044; G06F 2212/151; G06F 2212/651; G06F 12/0292
See application file for complete search history.

(56) References Cited

U.S. PATENT DOCUMENTS

| | | | |
|---|---|---|---|
| 2016/0378668 A1 | 12/2016 | Roberts et al. | |
| 2017/0192905 A1 | 7/2017 | Jermár | |
| 2017/0277639 A1* | 9/2017 | Awad | G06F 12/1036 |
| 2018/0081821 A1* | 3/2018 | Beaverson | G06F 3/0604 |
| 2018/0089100 A1 | 3/2018 | Krishnan et al. | |
| 2018/0349286 A1* | 12/2018 | Rana | G06F 12/1009 |
| 2019/0057040 A1* | 2/2019 | Jiang | G06F 12/1491 |

OTHER PUBLICATIONS

Combined Search and Examination Report for GB1718174.4, dated Apr. 26, 2018, 5 pages.

* cited by examiner

METHOD FOR LOCATING METADATA

This application is the U.S. national phase of International Application No. PCT/GB2018/052916 filed 11 Oct. 2018, which designated the U.S. and claims priority to GB Patent Application No. 1718174.4 filed 2 Nov. 2017, the entire contents of each of which are hereby incorporated by reference.

The present technique relates to data processing. More particularly, the present technique relates to locating metadata associated with addresses.

Locations may be identified by addresses. Some addresses corresponding to a location may be translated from a first address to a second address. It may be desirable for a software provider to associate metadata with addresses.

At least some examples provide a method for locating metadata associated with a first address, said method comprising:

accessing a page table structure, a page table entry of said page table structure providing address translation data for use in an address translation process for translating said first address into a second address;

extracting portions of at least two page table entries in said page table structure;

determining a pointer to a metadata table from said portions of the at least two page table entries; and using said pointer to locate, from said metadata table, target metadata associated with said first address.

At least some examples provide a method for associating metadata with a first address, said method comprising:

storing said metadata in a metadata table;

determining a pointer to said metadata table, said pointer comprising two or more portions; and storing each of said two or more portions in a respective one of a first set of two or more page table entries of a page table structure, a page table entry of said page table structure providing address translation data for use in an address translation process for translating said first address into a second address.

At least some examples provide a computer program comprising instructions which when executed causes a data processing apparatus to perform either of the methods mentioned above.

The present invention will be described further, by way of example only, with reference to embodiments thereof as illustrated in the accompanying drawings, in which:

FIG. 1 schematically illustrates one example of a data processing apparatus;

Figure 1:
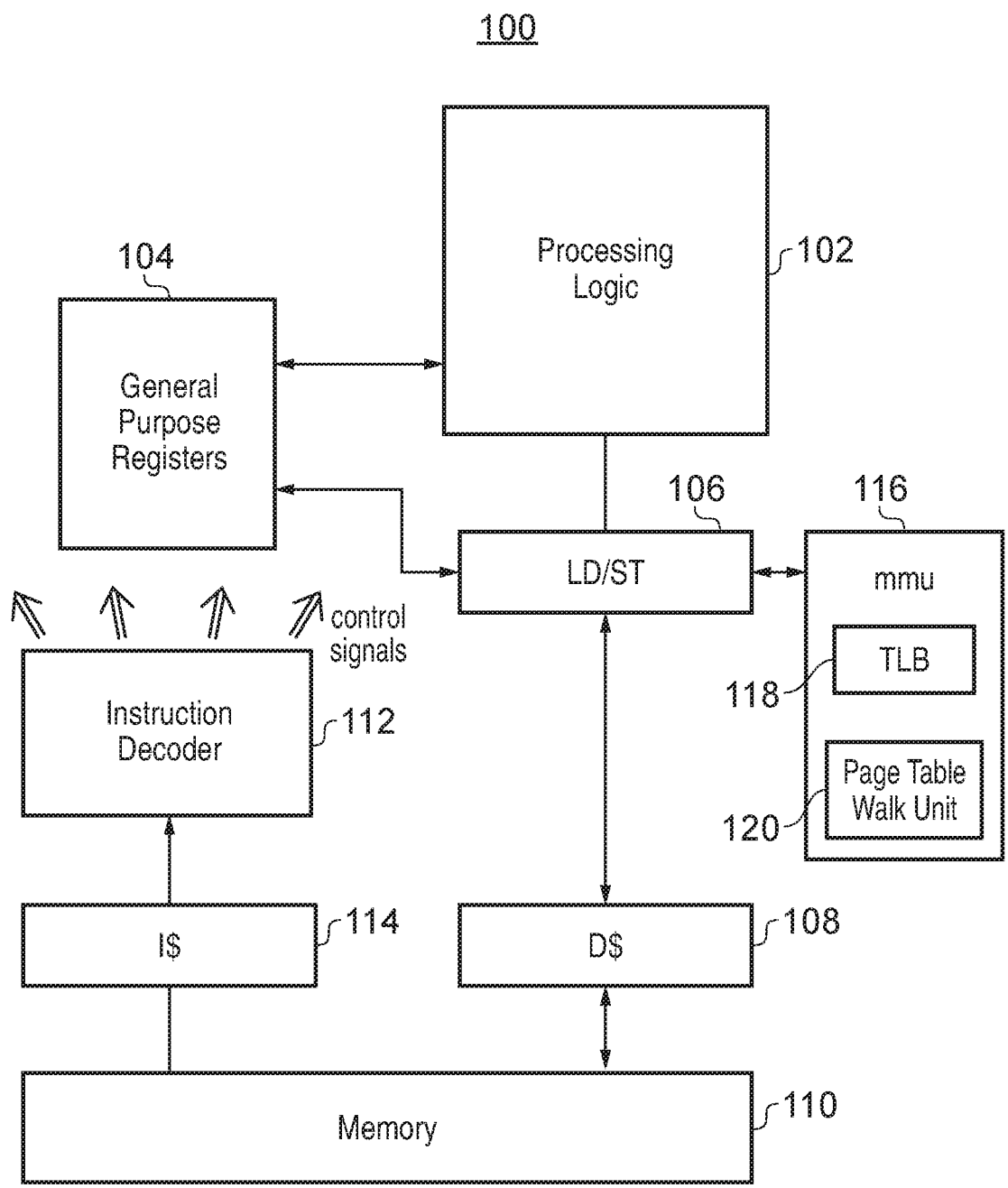

Some specific examples will be discussed below. It will be appreciated that the present technique is not limited to these particular examples.

It can be desirable to associate metadata with addresses. For example, the metadata may comprise statistical data related to accesses of a particular address, such as access amount, access frequency or access latency for example, and may be stored in a metadata storage structure. Another example of metadata may be software-annotated caching hints to assist with caching decisions. For example, the metadata may be recorded on a per-page basis.

One approach for locating metadata associated with a particular address within the metadata storage structure may be for a walk through a metadata tree structure to be performed, such that the location in the metadata storage structure storing the metadata for the particular address can be found. The metadata tree structure could be independent from page tables used for translation of addresses, and may be traversed based on the particular address in a similar way to a page table walk. However, maintaining an independent tree structure for locating metadata in this manner is onerous, and a significant latency may be incurred in performing the traverse of the tree.

The present technique recognises that in examples including address translation, an existing page table structure used for the address translation can be further used to locate address associated metadata for a given address in a metadata storage structure, even when the spare bits available in a page table entry for extra information not directly used for address translation is insufficient to store the metadata itself or an address pointer to a further location storing the metadata.

A page table structure may store address translation data in page table entries. When a given address is to be translated, a page table entry corresponding to the given address can be accessed to obtain address translation data for that address. The address translation data is then used to translate the given address into another address. In some instances, address translation data may be stored in several page tables organised in a hierarchy, each of the page tables comprising multiple page table entries. In this case, when a given address is to be translated, a page table walk through the hierarchy may be performed where a page table entry of each page table is sequentially accessed to obtain a pointer to a subsequent page table at a next level of the hierarchy. This process is repeated until a last level of the hierarchy is reached where a page table entry stores translation data used to translate the given address.

In one example, the present technique provides a method for locating metadata associated with a first address, said method comprising: accessing a page table structure, a page table entry of said page table structure providing address translation data for use in an address translation process for translating said first address into a second address; extracting portions of at least two page table entries in said page table structure; determining a pointer to a metadata table from said portions; and using said pointer to locate, from said metadata table, target metadata associated with said first address.

To exploit properties of the page table structure to provide a more efficient method for locating metadata, the present technique extracts portions of at least two page table entries of the page table structure, and determines a pointer for locating a metadata table from said portions. For example, the pointer could be determined by combining the portions of the at least two page table entries, or by concatenating the portions of the at least two page table entries. Referencing the metadata table from the page table structure can be more efficient than constructing an independent metadata tree as often the metadata associated with a first address may be required at the time when the first address is being translated to the second address, and so some of the memory/cache accesses needed for locating the relevant page table entries of the page table structure may already have been incurred for handling the address translation itself, rather than requiring a number of memory accesses independent of the translation accesses for traversing through a metadata tree structure, and also the likelihood of required entries being stored in a cache, so that they can be extracted more quickly. Furthermore, as an existing page table structure is used to locate the pointer to the metadata table from the first address, the present technique also reduces memory requirements since there is no need to allocate memory space for upper levels of a separate metadata tree structure (while the leaf nodes of a metadata tree may still be provided and referenced using the pointer from the page table structure, non-leaf nodes of the metadata tree become redundant as the existing page table structure can be used to provide the pointer identifying the location of the metadata table for a given address region).

By coalescing portions extracted from multiple page table entries to form the metadata table pointer, this allows the metadata table to be referenced from the page table structure even if there is little spare bitspace available per page table entry. This approach is unusual as typically each page table entry provides data which is independent of the data stored in other page table entries in the page table, rather than having a single data value (the pointer) split into portions and stored across multiple page table entries. While this may require access to some page table entries corresponding to addresses other than the first address which were not needed for an address translation for the first address itself, the overhead may still be less than traversing an independent metadata tree.

In some examples the using step further comprises determining from said pointer and said first address a target metadata location within said metadata table that stores said target metadata. For example, the determining step can comprise: determining from said pointer a base location of said metadata table; and determining from said first address a target metadata index for indexing into said metadata table to access said target metadata location. In some examples, the page table structure comprises a plurality of page tables at a plurality of levels, and said target metadata index is determined based on a target page table index of a target page table entry corresponding to the first address within a given page table at a given level. In this arrangement a natural association exists between the index provided by the first address, and metadata at an equivalent location in the metadata table. Therefore, processing can be further simplified as two independent indexing processes are not required for indexing into the page table and the metadata table.

In some examples, an offset of said target metadata location relative to said metadata table is determined as a multiple of a portion of said target page table index. For example, the offset may be a multiple of a least significant portion of the target page table index. This increases the capacity for metadata that can be stored in association with a given page table entry, as the physical memory space between indexes can be increased, whilst also maintaining the one-to-one mapping between the indexes of the metadata table and the page table.

In some examples said at least two page table entries correspond to contiguous regions of a first address space corresponding to said first address. This helps to reduce the number of memory accesses required for locating the at least two page tables containing portions of the pointer, and improves caching efficiency. For example, a cache line may be large, and include multiple page table entries, so when a single page table entry is to be retrieved from memory and stored in a cache or TLB, a number of surrounding page table entries will automatically also be retrieved and cached even though this may not have been explicitly instructed. Therefore, when the at least two page table entries correspond to a contiguous region of an address space, it is more likely that when one of them is cached, the others will also be cached. Even if no caching is performed, the number of memory accesses is still likely to be lower if contiguous page table entries are used to store the respective portions of the pointer.

In some examples, said page table structure comprises a plurality of page tables, said at least two page table entries are in the same page table of the page table structure as the target page table entry corresponding to the first address. In many cases, the metadata associated with the target page table entry will be required at or around the same time that an access to the target page table entry is performed. Therefore, storing the at least two page table entries and the target entry in the same page table reduces the number of accesses to different page tables required for the translation data and the associated metadata to be accessed. In some cases, the target page table entry itself may be one of the at least two page table entries accessed to obtain the pointer, but this may not be guaranteed for all first addresses.

In some examples, the same entries are selected as said at least two page table entries regardless of a relative position of the target page table entry within the given page table. This simplifies processing as the same at least two page table entries can be accessed by default whenever the metadata table is to be located.

In some other examples, a different set of at least two entries are selected as said at least two page table entries dependent on a relative position of the target page table entry within the given page table. Therefore, multiple sets of at least two page table entries may be included in the page table (and hence multiple instances of metadata table pointers). Storing pointers in multiple different locations in the page table increases the likelihood that the pointer can be determined from cached page table entries, reducing the chance that additional memory accesses will be needed. In some cases, the different sets of at least two page table entries may all point to the same metadata storage structure, with the redundancy allowing improved cacheability. Alternatively, each set of at least two page table entries could each point to different metadata storage structures, allowing an entire metadata storage region of any size to be associated with any number of page table entries.

In some examples, the given page table comprises a plurality of blocks of contiguous page table entries, and the at least two entries are selected from the same block as the target page table entry. Therefore, the at least two entries and the target entry will be closer together in the address space, which improves cache efficiency as it is more likely that the at least two entries and the target entry will be accessed at relatively nearby points in time, having the knock on effect of making it more likely that both the at least two entries and the target entry will be cached together.

In some examples, the method further comprises: determining from said first address an index indicative of a location of the target page table entry in a given page table of said page table structure; and determining from said index a location of said at least two page table entries in said given page table. This provides an easy and efficient way of locating both the target page table entry, and the at least two page table entries from a single index of the first address.

In some examples, said index is rounded at an intermediate bit position of the index to identify the location of said at least two page table entries in said given page table. Given that indexes provided by different addresses will correspond to different blocks of the page table, rounding the index at an intermediate bit position will provide a rounded index corresponding to one of the blocks of the page table. The at least two page table entries could then be those entries at the least significant end of the block. This way, multiple sets of pointer locations, one in each block, can be provided in the table, so that either redundant versions of the same pointer can be provided in each block to improve cacheability or multiple independent pointers can be provided per block to increase the capacity for metadata storage.

In some examples, said page table structure comprises a plurality of page tables organised in levels, said at least two page table entries comprise page table entries of a last level page table of said page table structure, said last level page table providing address mapping information for identifying said second address corresponding to said first address. In such an arrangement, the higher level page table entries provide a pointer to a subsequent page table, until a last level page table is reached where a pointer to a page in memory will be provided. The higher level page tables are thus associated with a number of pages in memory, and the particular page corresponding to a given address will be determined based on how the subsequent page tables are indexed. However, the page table entries of the last level page table have a one to one correspondence with pages in memory. Therefore, by locating pointers from the last level page table, a per-page association can be assumed between the first address and the metadata that is subsequently accessed.

Metadata may be stored in page table entries of the page table structure. However, in a typical page table entry format, there are relatively few spare bits that could be dedicated to this purpose. Therefore, the capacity for storing metadata in this manner is fairly limited. In some examples, said portions are extracted from reserved software fields of said at least two page table entries, so when the software fields of page table entries provide insufficient capacity for metadata, the present technique recognises that these bits of at least two page table entries can be used to store portions of a pointer to the metadata table.

In another example, the present technique provides a method for associating metadata with a first address, said method comprising: storing said metadata in a metadata table; determining a pointer to said metadata table, said pointer comprising two or more portions; and storing each of said two or more portions in a respective one of a first set of two or more page table entries of a page table structure, a page table entry of said page table structure providing address translation data for use in an address translation process for translating said first address into a second address. Associating metadata with a page table entry in this manner avoids the additional overhead (above the construction of the page table structure itself) of constructing a unique tree or table specifically dedicated to locating metadata associated with page table entries. Furthermore, the present technique in this instance allows the metadata associated with a target page table entry to be accessed faster, and with few memory accesses than would otherwise be required if a parallel structure were implemented.

In some examples, the method further comprises storing each of said two or more portions in a respective one of a second set of two or more page table entries of said page table structure. Storing the pointer in both a first set and a second set of two or more page table entries improves caching as it is more likely that when the pointer entries are required, at least one of the sets will already be cached.

In some examples, the method further comprises: determining a second pointer to a second metadata table, said second pointer comprising another two or more portions; and storing each of said another two or more portions in a respective one of a second set of two or more page table entries of said page table structure. In this way, additional metadata can be associated with page table entries of a page table structure, and the capacity for metadata is less constrained.

In some examples a computer program comprises instructions which when executed causes a data processing apparatus to perform either of the methods of the present technique discussed above.

In some examples, a computer readable storage medium storing the computer program. The computer readable storage medium may be a non-transitory storage medium.

Some particular embodiments will now be described with reference to the figures.

FIG. 1 shows one example of an apparatus 100. The apparatus 100 comprises processing logic 102 to perform data processing operations, such as arithmetic or floating point operations for example. The processing logic 102 is coupled to general purpose registers 104 that are arranged to store data and instructions to be used by the processing logic 102 when performing data processing operations, as well as a load/store unit 106 for retrieving/dispatching data from/to memory 110. A data cache 108 is coupled between the load/store unit 106 and the memory 110 to cache data that is expected to be required by the processing logic 102 in the near future. The data cache 108 can be accessed more quickly than the memory 110. An instruction decoder 112 decodes instructions to generate control signals for controlling other elements of the apparatus 100 such as the processing logic 102 or load/store unit 106. The instruction decoder 112 is coupled to an instruction cache 114 to store instructions for quicker access by the instruction decoder 112.

The apparatus 100 is further configured to implement a virtual addressing scheme, where virtual address spaces can be allocated to the various programs that the processing logic may be executing. Each virtual address space includes a series of virtually addressed pages that can be remapped to physical memory so that contiguous pages in the virtually address space need not be contiguous in the physical address space. For this implementation the apparatus 100 further comprises a memory management unit (MMU) 116, which is configured to handle translations between the virtual addresses referred to by programs, and physical addresses representing the physical locations in memory 110. The MMU may store the mapping between some virtual addresses and their corresponding physical addresses locally in a translation lookaside buffer (TLB) 118, in which case the physical address can be returned relatively quickly. When a required mapping is not stored in the TLB 118, a page table walk unit 120 is configured to perform a page table walk to refer to page tables stored in the memory 110 to obtain the required translation data.

In some examples, the address translation process may comprise multiple stages, with a virtual address first being translated into an intermediate physical address using address translation data from stage 1 page tables, which is subsequently translated into the corresponding physical address using address translation data from stage 2 page tables. Such an arrangement is appropriate for systems which use virtualisation, where the stage 1 page tables may be controlled by a virtual machine or guest operating system, and stage 2 page tables controlled by a hypervisor. While the subsequent embodiments for ease of explanation show an example where a page table structure provides translation data for translating virtual addresses to physical addresses, more generally the metadata pointers may be provided in any page table structure which translates a first address into a second address.

Figure 2:
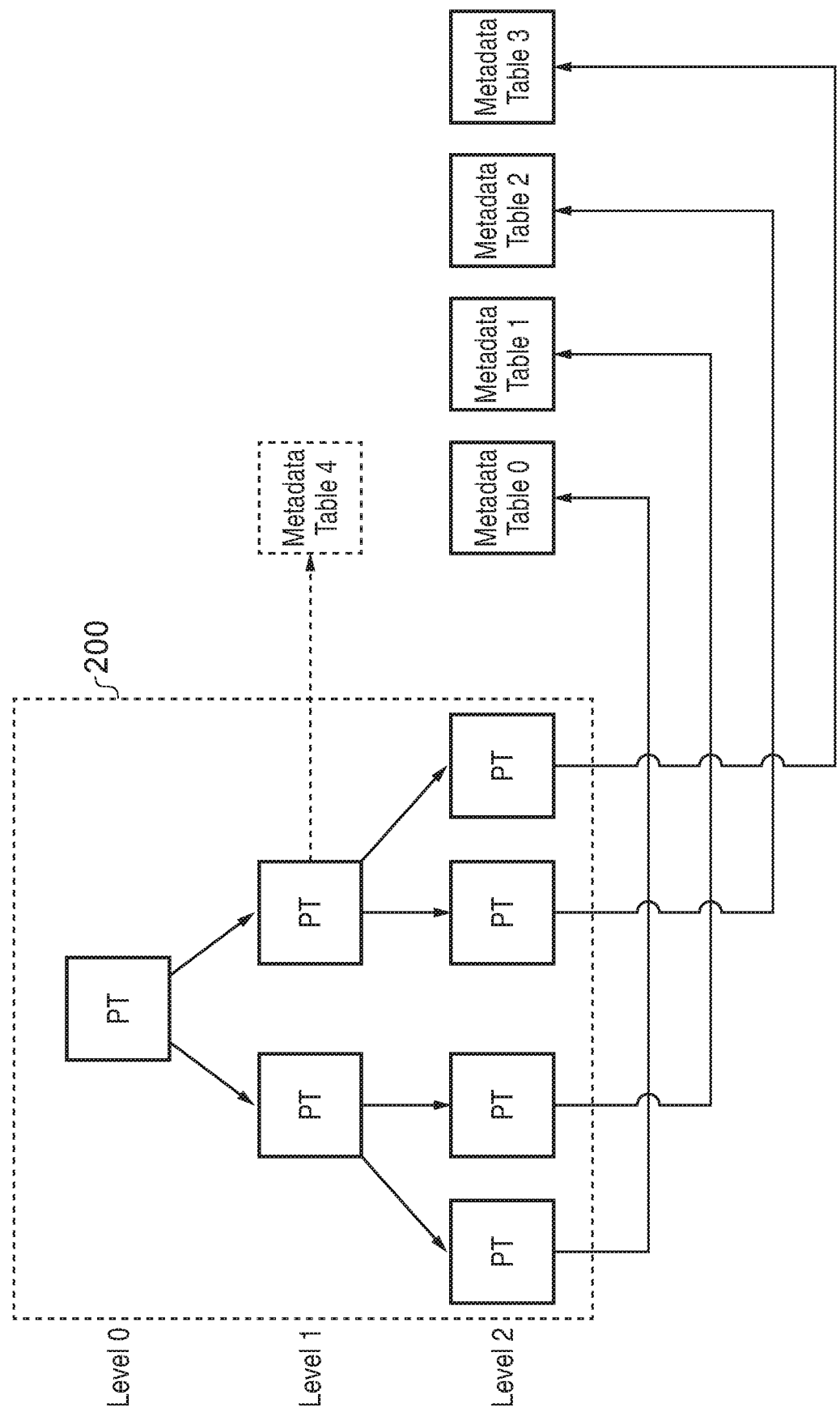
FIG. 2 shows one example of a page table structure comprising page tables which have associated metadata tables.

FIG. 2 shows one example of a page table structure 200. As can be seen the page table structure 200 includes multiple levels, Level0, Level1, and Level2. When a given virtual address is to be translated and the required address translation data is not in the TLB 118, a page table walk through the levels of the page table structure is performed. Starting from the Level0 table, the virtual address is used to determine which page table of the subsequent level is to be referred to, until arriving at the Level2 table which stores the physical address data required to translate the virtual address into the corresponding virtual address. Each of the Level2 page tables, and a Level1 page table are associated with a corresponding metadata table. However, it will be appreciated that this arrangement is implementation specific, and in other examples more, or less, of the page tables will be associated with corresponding metadata tables.

Figure 3:
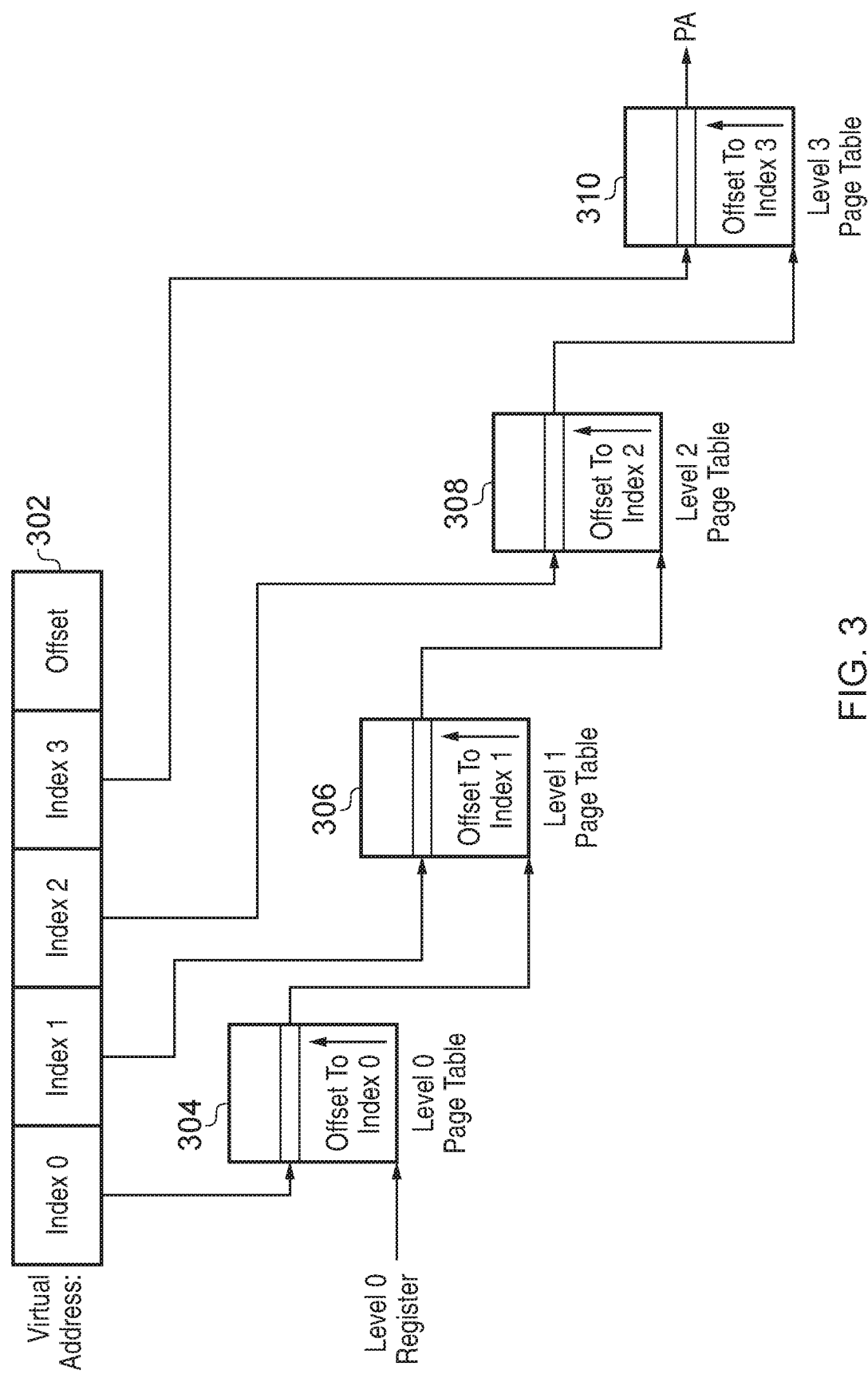
FIG. 3 shows an example of a page table walk performed to obtain a physical address from a virtual address.

FIG. 3 provides a more detailed illustration of a how a page table walk may be performed to retrieve an address translation mapping (e.g. providing the physical address data) from the page table structure 200. In the example of FIG. 3, a virtual address 302 includes four indexes: Index0, Index1, Index2 and Index3, which are used to index into the respective levels of page table to find the address mapping for the target page identified by the index portions, as well as an offset which identifies a particular address within the target page. While FIG. 3 shows an example where the index portions are used as is to index into the page table levels, it is also possible to apply a hash to the index portions of the address to find the corresponding page table index. When the virtual address 302 is to be translated and the required address translation data is not already cached in the TLB, the MMU refers to a Level0 base address register to determine the location of the base of the Level0 page table, and Index0 of the virtual address 302 is used to determine an offset from the base address, where a next level pointer is stored within a page table entry of the page table 304. The pointer can be used to determine which of the Level1 page tables should be accessed for the next stage of translation of this particular virtual address 302. In this example, the pointer points to Level1 table 306. By then indexing into the Level1 table based on Index1 of the virtual address, a further pointer to the base of one of the Level2 page tables can be obtained. The Level2 and Level3 tables are then indexed in the same way as the Level0 and Level1 tables. However, instead of containing a pointer to a page table at a subsequent stage, the indexed page table entry of the Level3 table stores physical address data which can be used to access the physical address corresponding to virtual address 302. The physical address data can be combined with the offset of the virtual address to form the corresponding physical address to be accessed for that virtual address.

Figure 4:
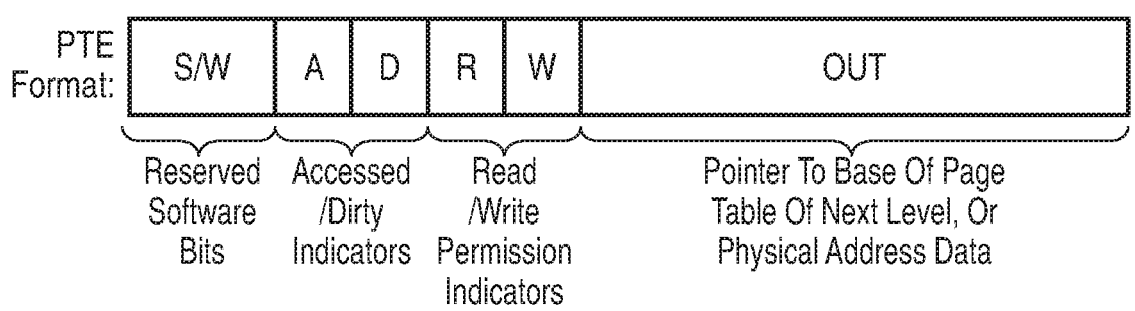
FIG. 4 shows one example of the format of a page table entry.

FIG. 4 illustrates one example page table entry format. As can be seen from FIG. 4, an OUT field includes either a pointer defining the base address of a page table of the next level that is to be accessed during a page table walk for a given address, or if the page table entry is in a final level page table, the translated address data defining the address mapping corresponding to the virtual address. Read/Write permission indicators are also included, which indicate whether a particular page table entry can be written over, or read. The accessed/dirty indicators indicate whether the page table entry has been accessed, or if it has become dirty and needs to be invalidated respectively. A further subset of the bits are reserved for software, and can be used as desired by a programmer or compiler.

The present technique recognises that while the reserved software bits of a page table entry can be used to directly store metadata associated with the page table entry, this may not always provide enough storage. Furthermore, the present technique recognises that the reserved software bits may instead be used to provide a pointer to a supplemental metadata storage table to not only provide a larger capacity for storing metadata, but also to provide the metadata storage table in a way that can be accessed efficiently. For example, the software bits of a set of page table entries may be used to store a pointer to a metadata table associated with a given page table. This allows an arrangement such as that shown in FIG. 2 to be implemented, with metadata tables being associated with page tables, where only the spare bits of page table entries are required to locate the associated metadata tables.

Figure 5:
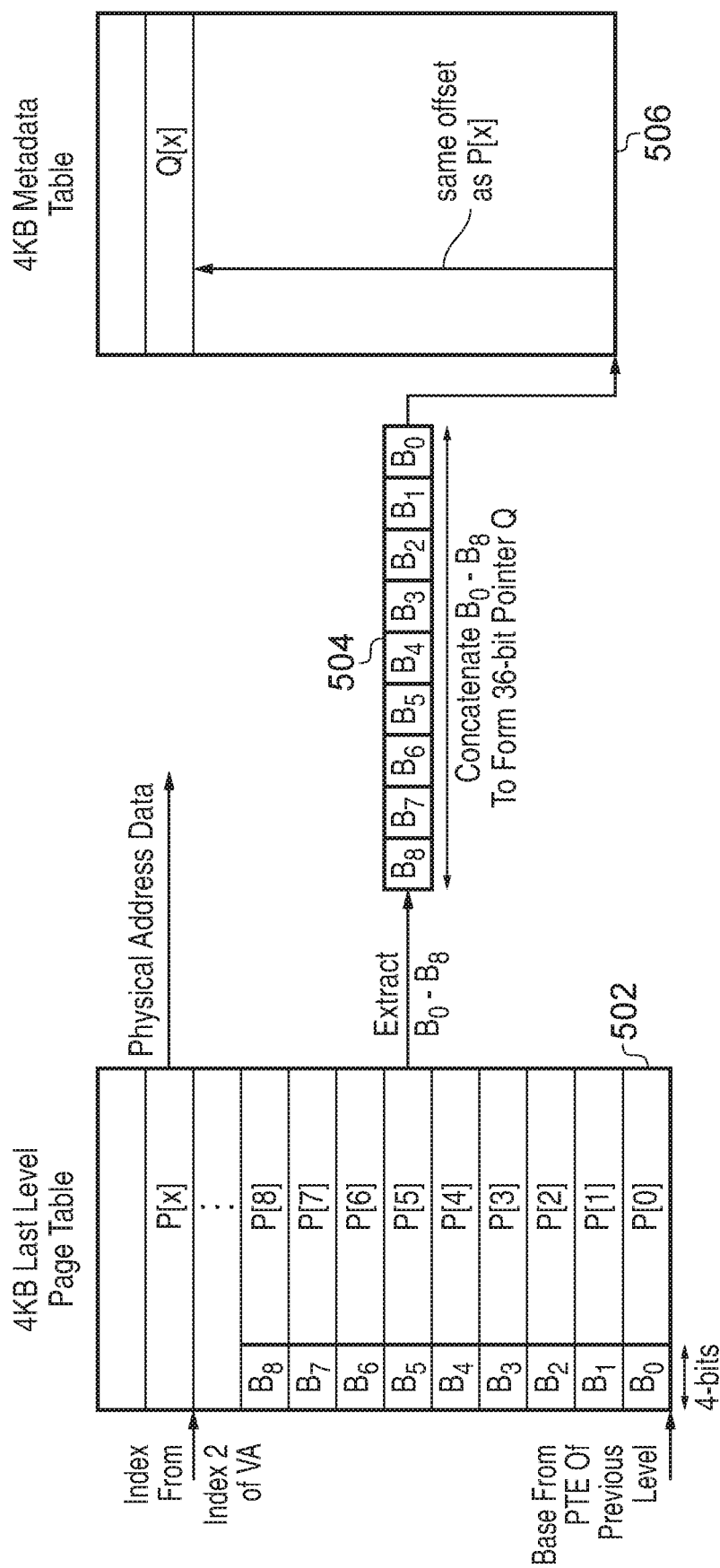
FIG. 5 shows how a pointer to a metadata table can be extracted from page table entries.

FIG. 5 illustrates one example of how the software bits of a set of page table entries can be used to store a pointer to a metadata table associated with the page table. The base of a 4 kB last level page table 502 is located according to a pointer read from a page table entry of a previous level. Upon locating the table, software determines that there is a metadata table associated with this page table entry, and that there is a pointer to this metadata table embedded in bit portions $B_0$-$B_8$ of page table entries P[0]-P[8] respectively (where each bit portion $B_x$ corresponding to the software-reserved field of the corresponding page table entry P[x], which may comprise multiple bits). As the bit portions $B_0$-$B_8$ are fields that are reserved for software, and thus implementation of this example does not require any modification to hardware of an apparatus. $B_0$-$B_8$ are extracted from page table entries P[0]-P[8], and concatenated to form a pointer Q 504, which can be used to locate the base of a 4 KB metadata table 506 associated with the page table 502. It will be appreciated that the exact number of page table entries needed to form the complete pointer using the concatenated bit portions B will depend on the size of the pointer and the number of spare software-reserved bits available per page table entry (e.g. in this example if the pointer has 36 bits and the software-reserved field has 4 bits, then 9 page table entries are needed).

In some examples, the present technique operates on the assumption that any metadata stored in the metadata table 506 is generally associated with the 4 kB block of addresses corresponding to one page table 502, with the association being determined on the basis of pointer Q 504.

However, in other examples, metadata can be more specifically associated with individual page table entries of the page table 502. For example, when a metadata element Q[x] is specifically associated with a page table entry P[x], it may be stored and accessed from the metadata table 506 based on an offset corresponding to the offset of P[x] relative to the base of the page table 502. For example, in FIG. 5 P[x] is located in page table 502 based on Index2 of a virtual address, and thus Index2 may also be used to locate the metadata associated with P[x] (namely Q[x]) in the metadata table 506. Organising and accessing metadata in this way allows for metadata elements to be specifically associated with individual page table entries without requiring any further indexing or lookup techniques to be implemented beyond those used to locate P[x] in the page table 502.

As also shown in FIG. 5, P[x] may also be accessed to obtain the physical address data for the virtual address, thus completing the translation process. However, it will be appreciated that a target page table entry need not be accessed when obtaining the metadata associated with the target page table entry. For example, in other instances, Q[x] may be obtained without an access being made to P[x].

Although it may appear from FIG. 5 that a number of additional memory accesses would be needed to access the page table entries (PTEs) required for obtaining all the portions of the metadata pointer, in addition to accessing the target page table entry P[x] itself, in practice, as the pointer portions $B_0$-$B_8$ are stored in contiguous PTEs which are stored in contiguous regions of the address space and correspond to contiguous regions of the memory address space, the number of additional memory accesses needed may be limited. In many implementations the size of a cache line corresponds to a fixed size of data that can be loaded from memory and stored in a cache, which may be larger than the size of one page table entry. Hence, when a request to memory is made for a given page table entry, a number of other page table entries may also be loaded from memory and may also be cached (either in the TLB 118 or in the data cache 108 for example). By using contiguous PTEs to store the pointer, this reduces the number of memory accesses required. Also, as the pointer is stored in the same page table are the target page table entry, and patterns of access to memory tend to be localised, there is a reasonable chance that the additional PTEs needed for the pointer are still cached in the data cache 108 so that the pointer can be extracted relatively efficiently.

Figure 6:
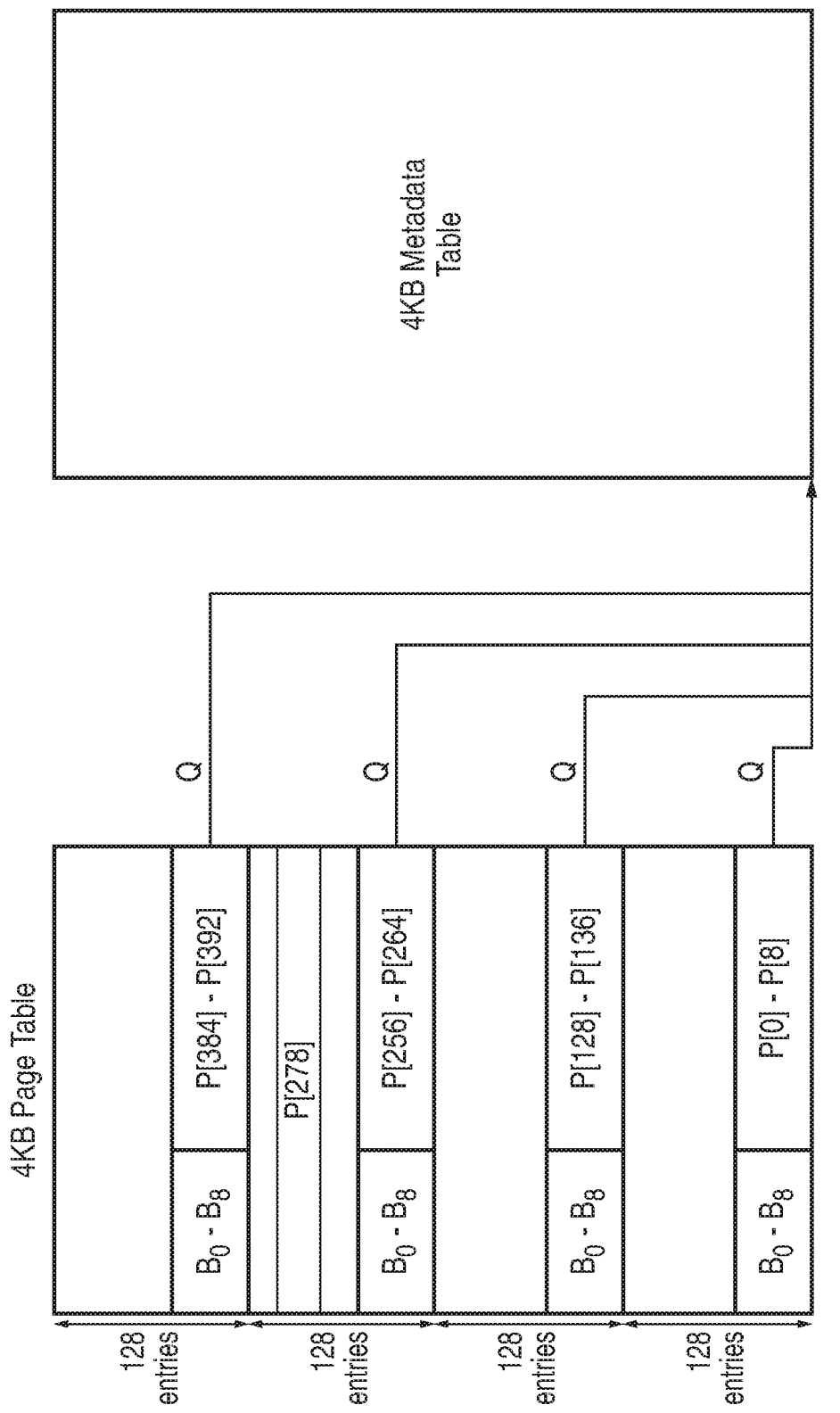
FIG. 6 shows an example of how a pointer can be extracted from one of multiple blocks of page table entries.

FIG. 6 shows an example of how the present technique may take advantage of cache locality properties to improve efficiency further. Multiple instances (e.g. 4 instances) of the pointer Q may be embedded in different pointer sets of page table entries. For example, with a 4 kB page table comprising 512 8-byte PTEs, the pointer sets may be spaced at intervals of 128 entries. That is, each of the page table entries of the pointer sets: P[0]-P[9], P[128]-P[136], P[256]-P[264] and P[384]-P[392] have the portions of Q stored in their reserved software bits such that Q can be reconstructed from any of the sets. Thus, the set of pointer-storing PTEs nearest to the target PTE corresponding to the target address could be selected to obtain the metadata pointer, so that when a target page table entry is in the cache, there is greater chance that the nearest set of pointer-storing PTEs will also be in the cache, as it is common for page table entries having addresses nearby to the target page table entry in the address space to still be cached when the target page table entry is needed. For example, when P[278] is accessed, it is more likely that P[256]-P[264] will be cached than P[0]-P[8] for example.

Figure 7:
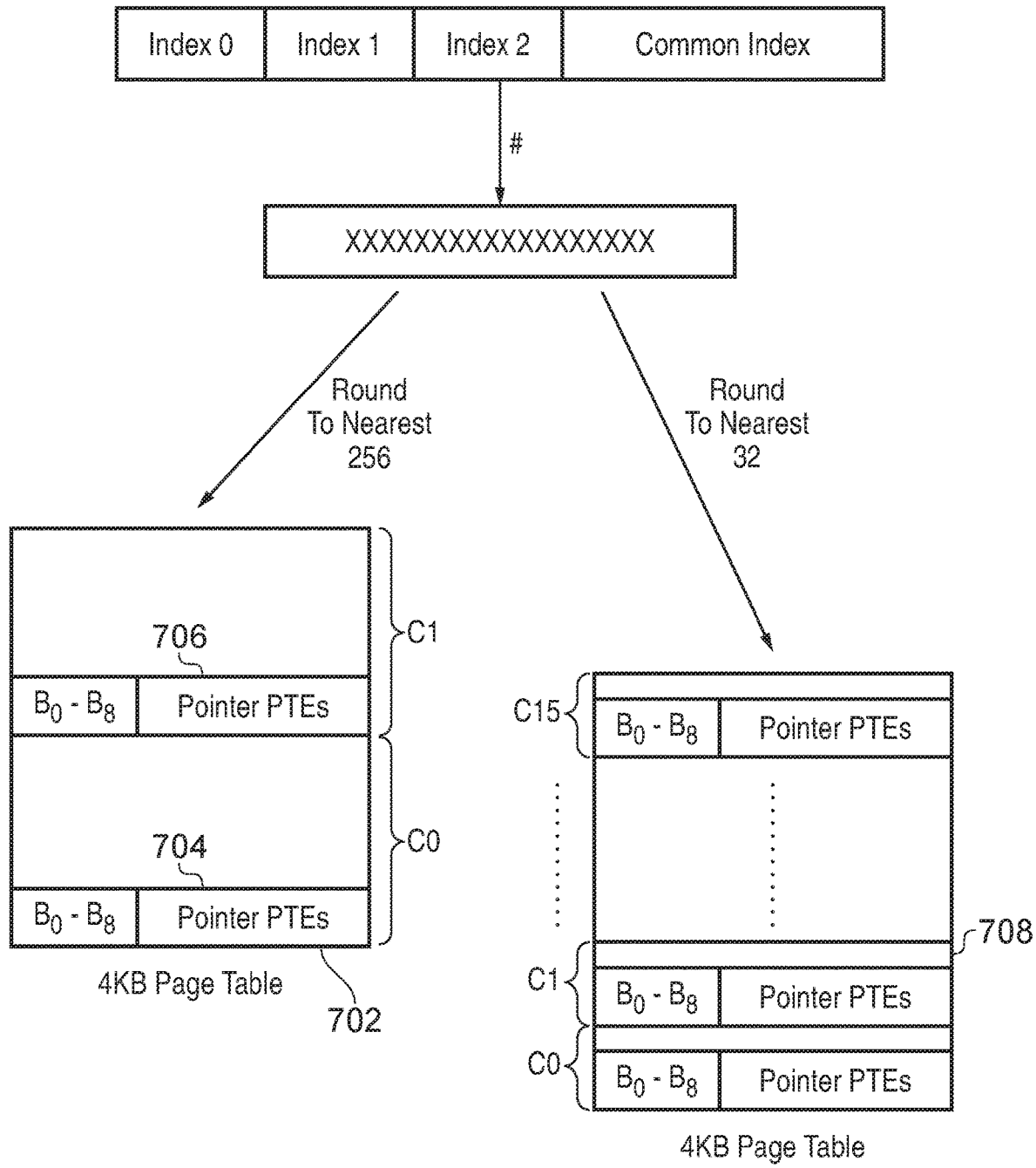
FIG. 7 shows an example of how page table entries storing portions of a pointer can be located from a first address.

It is relatively straightforward to locate the relevant pointer sets for a target page table entry. For example, as shown in FIG. 7, a page table 702 may be divided into two chunks, C0 and C1, with each chunk storing a pointer set of page table entries 704, 706. The index that is to be used to index into the page table 702 to locate the target page table entry (not shown) can thus be rounded down to the nearest multiple of 2K to locate the base of the pointer set. The pointer entries of the pointer set can then be located by incrementing from the base by a number equal to the number of pointer entries in the set, which in this case is 8 as there are 9 page table entries that include portions of the pointer. Similarly, when more chunks contain a pointer set, such as the case with page table 708, the index is instead rounded to a smaller base number. For example, page table 708 is divided into 16 chunks C0-C1, each of which stores a pointer set. Therefore the index is rounded down to the nearest multiple of 256 bytes to locate the base of the pointer set.

Figure 8:
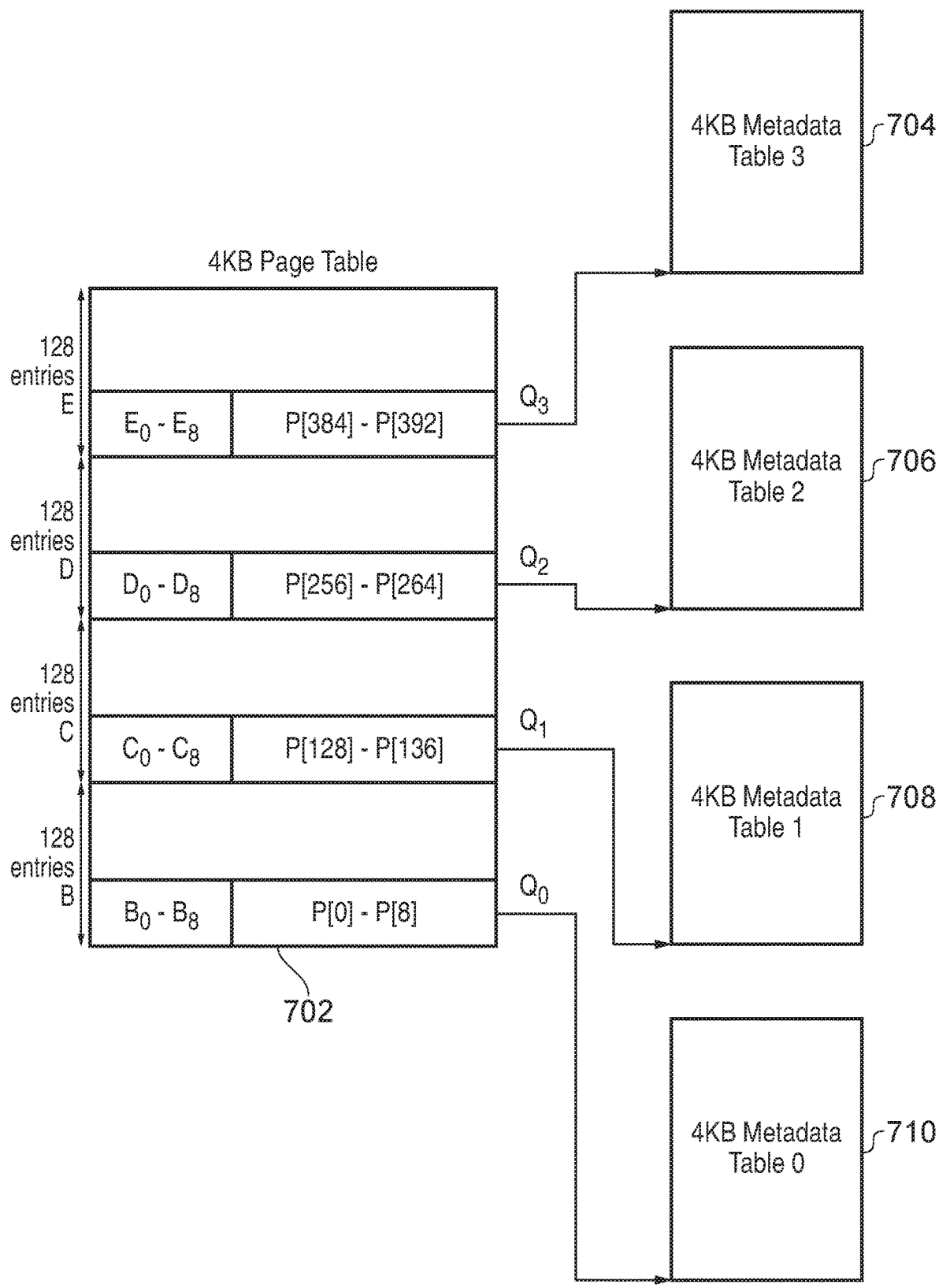
FIG. 8 shows an example of increasing the capacity for metadata associated with a page table.

FIG. 8 illustrates another example of how embedding multiple pointer sets in a page table can increase the capacity for metadata to be associated with page table entries. As with the example in FIG. 6, the page table 702 of FIG. 8 includes four pointer sets, each including 9 page table entries. However, a different pointer is embedded in each of the pointer sets. For example, bit portions $B_0$-$B_8$ of entries P[0]-P[8] can be concatenated to form pointer $Q_0$ to metadata table0 710, whilst bit portions $C_0$-$C_8$ of entries P[128]-P[136] can be concatenated to form pointer $Q_1$ to metadata table1 708. In this way, each of the 128 entry blocks in the page table 702 can be associated with their own 4 KB metadata table, significantly increasing the capacity for metadata to be associated with page table entries of the page table 702. Moreover, locating metadata specific to a particular page table entry can be implemented in a straightforward manner by multiplying a portion of the index of a target page table entry by a constant value. In the example of FIG. 8, there is four times the capacity to store metadata than that of page table entries. Therefore, an offset corresponding to the 128 entries B can be multiplied by 4 to offset into metadata table0. For the blocks of entries: C, D, and E, a portion of the upper bits of the index indicating the offset must be ignored such that the base of the block of entries corresponds to the base of the corresponding metadata table, with the remaining least significant bits being multiplied by 4 in order to index to the relevant metadata table.

Figure 9:
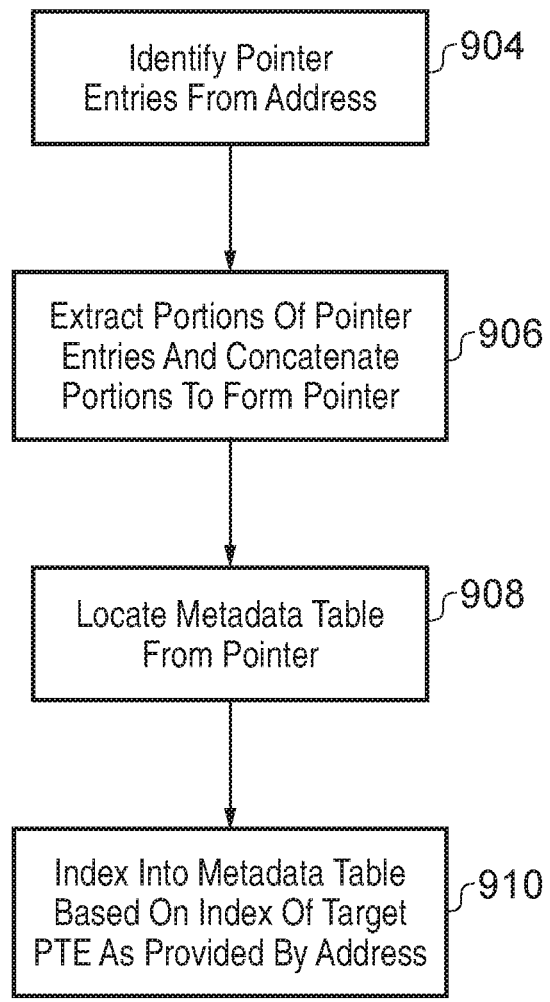
FIG. 9 shows a flowchart for extracting a pointer to a metadata table.

FIG. 9 shows a method for locating metadata associated with an address. First, the pointer entries of the page table structure that store portions of the pointer to the metadata table are identified in step 904. This may be achieved by applying the rounding technique as described with reference to FIG. 7 to the index portion of the address used for the corresponding level of page table in the page table structure, for example. In step 906 the portions of the pointer entries are extracted and concatenated to determine the pointer, and in step 908 the metadata table storing the associated metadata is located based on the pointer. In other examples, the pointer could be formed by combining the portions of the pointer entries in a manner other than concatenation (e.g. there could be some additional bits inserted in between the extracted portions in the assembled pointer). Furthermore, to identify the metadata that is specifically associated with the address, in step 910 an index of a target page table entry as provided by the address is used to generate the index into the metadata table to locate the associated metadata (e.g. the metadata index could be the same as the target page table index, or the metadata could be derived by multiplying a least significant portion of the target page table index by a multiplying factor corresponding to the number of separate metadata pages corresponding to one page table in the page table structure).

Figure 10:
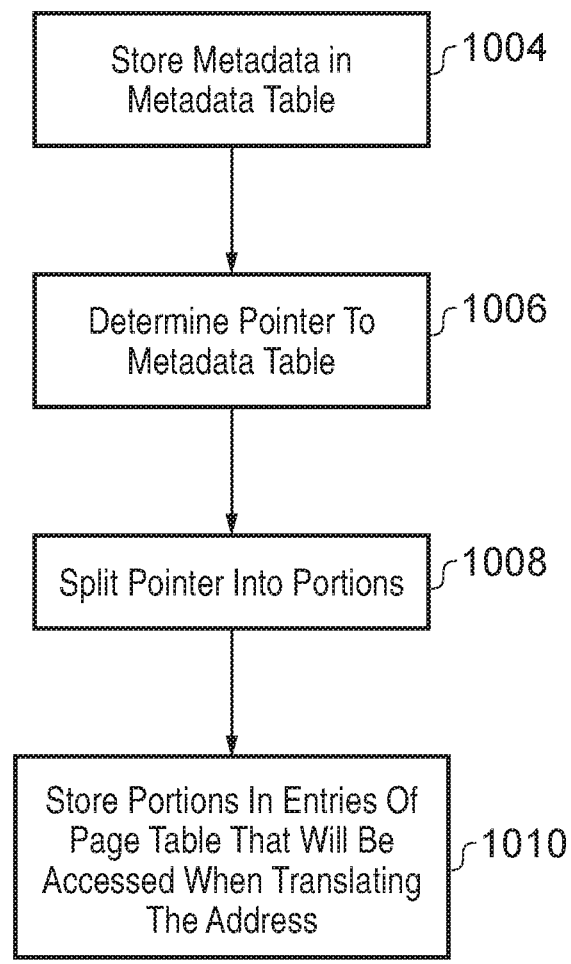
FIG. 10 shows a flowchart for storing a pointer to a metadata table in a page table.

FIG. 10 shows a method for associating metadata with an address. First in step 1004, metadata is stored in the metadata table at the location indexed based on the address in a corresponding way to step 910 of FIG. 9. In step 1006 a pointer to the base of the metadata is determined, and split into portions in step 1008. In step 1010 the portions are stored in entries of the page table that will be accessed when translating the corresponding address.

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A method performed by a data processing apparatus for locating metadata associated with a first address, said method comprising the following steps:
   accessing, by the data processing apparatus, a page table structure from a translation lookaside buffer, cache, or memory of the data processing apparatus, a page table entry of said page table structure providing address translation data for use in an address translation process for translating said first address into a second address;
   extracting, by the data processing apparatus, portions of at least two page table entries in said page table structure;
   determining, by the data processing apparatus, a pointer to a metadata table in metadata storage from said portions of the at least two page table entries; and
   the data processing apparatus using said pointer to locate, from said metadata table, target metadata associated with said first address.

2. The method according to claim 1, wherein said using step further comprises:
   determining from said pointer and said first address a target metadata location within said metadata table that stores said target metadata.

3. The method according to claim 2, wherein said determining step comprises:
   determining from said pointer a base location of said metadata table; and
   determining from said first address a target metadata index for indexing into said metadata table to access said target metadata location.

4. The method according to claim 3, wherein said page table structure comprises a plurality of page tables at a plurality of levels, and said target metadata index is determined based on a target page table index of a target page table entry corresponding to said first address within a given page table at a given level.

5. The method according to claim 4, wherein an offset of said target metadata location relative to said base location of said metadata table is determined as a multiple of a portion of said target page table index.

6. The method according to claim 1, wherein said at least two page table entries correspond to contiguous regions of a first address space corresponding to said first address.

7. The method according to claim 1, wherein said page table structure comprises a plurality of page tables, and said at least two page table entries and a target page table entry corresponding to said first address are within a same page table of the page table structure.

8. The method according to claim 7, wherein the same entries are selected as said at least two page table entries regardless of a relative position of the target page table entry within the given page table.

9. The method according to claim 7, wherein a different set of at least two entries are selected as said at least two page table entries dependent on a relative position of the target page table entry within the given page table.

10. The method according to claim 9, wherein the given page table comprises a plurality of blocks of contiguous page table entries, and the at least two page table entries are selected from the same block as the target page table entry.

11. The method according to claim 1, comprising:
    determining from said first address an index indicative of a location of a target page table entry corresponding to said first address in a given page table of said page table structure; and
    determining from said index a location of said at least two page table entries in said given page table.

12. The method according to claim 11, wherein said index is rounded at an intermediate bit position of the index to identify the location of said at least two page table entries in said given page table.

13. The method according to claim 1, wherein said page table structure comprises a plurality of page tables organised in levels, and said at least two page table entries comprise page table entries of a last level page table of said page table structure, said last level page table providing address mapping information for identifying said second address corresponding to said first address.

14. The method according to claim 1, wherein said portions are extracted from reserved software fields of said at least two page table entries.

15. A non-transitory storage medium storing a computer program comprising instructions which when executed by a data processing apparatus, causes the data processing apparatus to perform the method according to claim 1.

16. A method performed by a data processing apparatus for associating metadata with a first address, said method comprising the following steps:
    storing, by the data processing apparatus, said metadata in a metadata table provided in metadata storage;
    determining, by the data processing apparatus, a pointer to said metadata table, said pointer comprising two or more portions; and
    storing, by the data processing apparatus, each of said two or more portions in a respective one of a first set of two or more page table entries of a page table structure stored in a translation lookaside buffer, cache or memory of the data processing apparatus, a page table entry of said page table structure providing address translation data for use in an address translation process for translating said first address into a second address.

17. The method according to claim 16, comprising storing each of said two or more portions in a respective one of a second set of two or more page table entries of said page table structure.

18. The method according to claim 16, further comprising:

determining a second pointer to a second metadata table, said second pointer comprising another two or more portions; and
storing each of said another two or more portions in a respective one of a second set of two or more page table entries of said page table structure.

* * * * *